United States Patent
Morilhat et al.

(10) Patent No.: US 9,446,693 B2
(45) Date of Patent: Sep. 20, 2016

(54) HEIGHT-ADJUSTABLE HEAD RESTRAINT FOR A VEHICLE SEAT AND VEHICLE SEAT WITH A HEIGHT-ADJUSTABLE HEAD RESTRAINT

(75) Inventors: Philippe Morilhat, Lipsheim (FR); Mikulas Ptasinsky, Giraltovce (SK); Peter Pastorek, Puchov (SK)

(73) Assignee: Johnson Controls Technology Company, Holland, MI (US)

( * ) Notice: Subject to any disclaimer, the term of this patent is extended or adjusted under 35 U.S.C. 154(b) by 132 days.

(21) Appl. No.: 14/343,045

(22) PCT Filed: Jul. 4, 2012

(86) PCT No.: PCT/EP2012/062992
§ 371 (c)(1),
(2), (4) Date: Apr. 21, 2014

(87) PCT Pub. No.: WO2013/034332
PCT Pub. Date: Mar. 14, 2013

(65) Prior Publication Data
US 2014/0225413 A1  Aug. 14, 2014

(30) Foreign Application Priority Data
Sep. 7, 2011 (DE) .................. 10 2011 112 503

(51) Int. Cl.
*A47C 1/10* (2006.01)
*B60N 2/48* (2006.01)

(52) U.S. Cl.
CPC ............ *B60N 2/4864* (2013.01); *B60N 2/482* (2013.01); *B60N 2/4808* (2013.01); *B60N 2/4829* (2013.01); *B60N 2/4838* (2013.01)

(58) Field of Classification Search
CPC . B60N 2/4817; B60N 2/4814; B60N 2/4864
USPC ...................................... 297/410, 391
See application file for complete search history.

(56) References Cited

U.S. PATENT DOCUMENTS

| 4,466,663 A * | 8/1984 | Oishi | B60N 2/4811 297/391 |
|---|---|---|---|
| 5,918,940 A * | 7/1999 | Wakamatsu | B60N 2/067 297/378.12 |
| 6,550,856 B1 * | 4/2003 | Ganser | B60N 2/20 297/216.12 |

(Continued)

FOREIGN PATENT DOCUMENTS

| CN | 1822967 A | 8/2006 |
|---|---|---|
| CN | 201157156 Y | 12/2008 |

(Continued)

OTHER PUBLICATIONS

Office Action dated Apr. 22, 2015 received in corresponding Japanese Application No. 2014-528908, 3 pages.

(Continued)

*Primary Examiner* — Laurie K Cranmer
(74) *Attorney, Agent, or Firm* — Foley & Lardner LLP

(57) ABSTRACT

In a height-adjustable arrangement of a head restraint on a vehicle seat, the head restraint or at least one cushion of the head restraint is fastened by a receiving plate fixed on a framework to a receiving slide of a height-adjustment mechanism. The receiving slide is arranged in a height-displaceable manner on at least one guide element of the height-adjustment mechanism by at least two actuating pulls acting in an opposed manner on the receiving slide, the guide element being arranged in or on a holding element of the head restraint. A vehicle seat can include a height-adjustable head restraint.

10 Claims, 10 Drawing Sheets

(56) References Cited

U.S. PATENT DOCUMENTS

Figure 1:
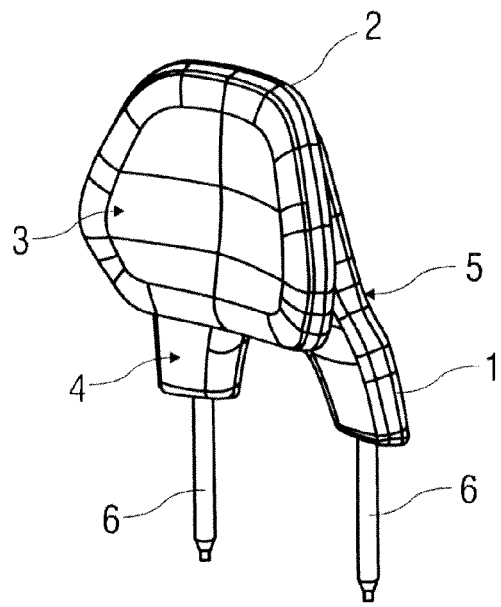

| | | | | |
|---|---|---|---|---|
| 6,805,411 | B2* | 10/2004 | Gramss | B60N 2/4885 297/216.12 |
| 6,899,395 | B2* | 5/2005 | Yetukuri | B60N 2/4817 297/408 |
| 7,048,336 | B2* | 5/2006 | Mawbey | B60N 2/4885 297/408 |
| 7,798,570 | B2* | 9/2010 | Kwiecinski | B60N 2/4885 297/216.12 |
| 8,038,219 | B2* | 10/2011 | Boes | B60N 2/4885 297/406 |
| 8,118,360 | B2 | 2/2012 | Oota et al. | |
| 8,459,745 | B2* | 6/2013 | Wahlers | B60N 2/4805 297/410 |
| 8,573,686 | B2* | 11/2013 | Bruck | B60N 2/20 297/61 |
| 2003/0111890 | A1* | 6/2003 | Zimmermann | A47C 7/38 297/410 |
| 2005/0046262 | A1 | 3/2005 | Mawbey et al. | |
| 2005/0088027 | A1 | 4/2005 | Yetukuri et al. | |
| 2006/0226689 | A1* | 10/2006 | Linnenbrink | B60N 2/4829 297/408 |
| 2007/0120403 | A1* | 5/2007 | Drexler | B60N 2/2222 297/250.1 |
| 2010/0164272 | A1 | 7/2010 | Oota et al. | |
| 2011/0175422 | A1 | 7/2011 | Bruck | |

FOREIGN PATENT DOCUMENTS

| | | |
|---|---|---|
| CN | 201347014 Y | 11/2009 |
| DE | 197 27 097 A1 | 1/1998 |
| DE | 103 35 268 B3 | 12/2004 |
| DE | 10 2006 033137 A1 | 3/2007 |
| DE | 10 2006 045516 B3 | 2/2008 |
| JP | 10-071046 A | 3/1998 |
| JP | 2004-352165 A | 12/2004 |
| JP | 2010-149694 A | 7/2010 |
| WO | WO 2009/043996 A2 | 4/2009 |

OTHER PUBLICATIONS

International Search Report issued in related International Patent Application No. PCT/EP2012/062992, completed Feb. 26, 2013.

Office Action issued in Korean Patent Application No. 10-2014-7009201 dated Mar. 16, 2015 (with English translation).

Office Action dated Aug. 5, 2015, in corresponding Chinese application No. 201280043262.5, 7 pages.

Office Action dated Sep. 29, 2015, in corresponding Korean application No. 10-2014-7009201, 3 pages.

Office Action dated Apr. 11, 2016, in corresponding Chinese Application No. 201280043262.5, 8 pages.

* cited by examiner

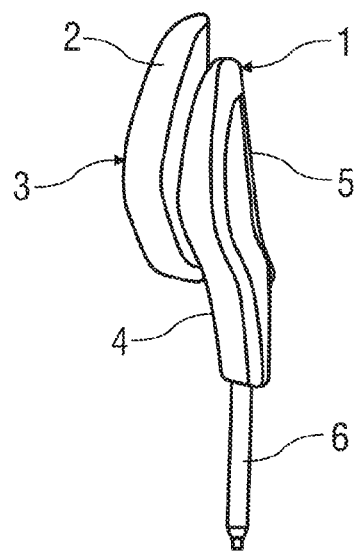
FIG 3
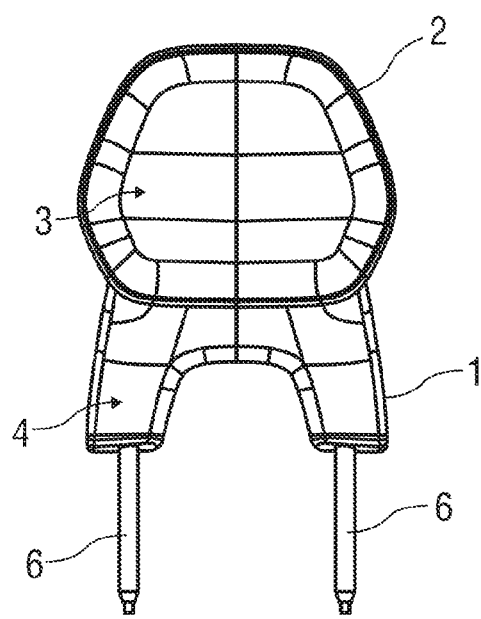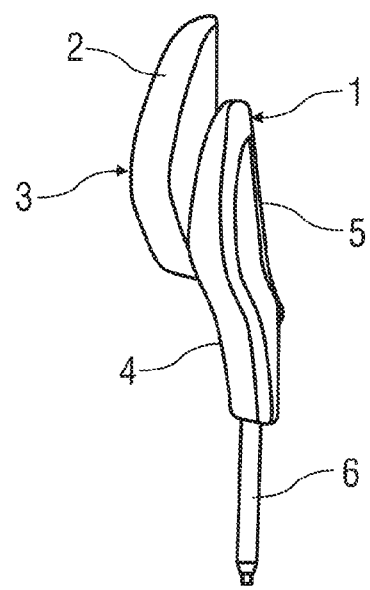
FIG 4 FIG 5

HEIGHT-ADJUSTABLE HEAD RESTRAINT FOR A VEHICLE SEAT AND VEHICLE SEAT WITH A HEIGHT-ADJUSTABLE HEAD RESTRAINT

CROSS-REFERENCE TO RELATED APPLICATION(S)

The present application is a U.S. National Phase of International Patent Application No. PCT/EP2012/062992, filed Jul. 4, 2012, which claims priority from German Patent Application No. 10 2011 112 503.9, filed Sep. 7, 2011. The contents of these applications are incorporated herein by reference in their entirety.

DESCRIPTION

The invention relates to a height-adjustable head restraint for a vehicle seat. The invention further relates to a vehicle seat with a height-adjustable head restraint.

In the prior art, head restraints are arranged on two rod-shaped holding elements at an upper end of a backrest of a vehicle seat, wherein the holding elements are able to be inserted at least partially in correspondingly shaped receiving means in the backrest of the vehicle seat. The height of the head restraint is adjustable depending on the depth of penetration of the holding elements in the backrest.

It is the object of the present invention to specify a height-adjustable head restraint for a vehicle seat which is improved relative to the prior art and an improved vehicle seat.

With regard to the height-adjustable head restraint for a vehicle seat, the object is achieved by the features specified in claim 1.

With regard to the vehicle seat with a height-adjustable head restraint, the object is achieved by the features specified in claim 9.

Advantageous developments of the invention form the subject matter of the sub claims.

In the height-adjustable head restraint for a vehicle seat, at least one head restraint cushion of the head restraint according to the invention is fastened by means of a receiving plate fixedly to the frame of a receiving slide of a height-adjustment mechanism, wherein the receiving slide is arranged in a height-adjustable manner on at least one guide element of the height adjustment mechanism, by means of at least two actuating cables acting in opposing directions on the receiving slide, said height adjustment mechanism being arranged in or on a holding element of the head restraint.

As a result, a more comfortable height adjustment mechanism for a head restraint on a vehicle seat, which is able to be operated more easily relative to the prior art, is possible.

Expediently, a height adjustment mechanism for a head restraint of a vehicle seat which is of particularly flat construction is possible, wherein in particular no metal rod-shaped holding elements are visible between a backrest of the vehicle seat and the head restraint.

In a particularly advantageous embodiment, the height adjustment mechanism of the head restraint is able to be driven by means of an electric motor.

In a further advantageous embodiment, an inclination of the head restraint is able to be adjusted relative to a backrest of the vehicle seat.

Preferably, the holding element is arranged fixedly on a backrest of the vehicle seat, wherein the head restraint or at least the head restraint cushion is arranged on the holding element so as to be able to be altered in height and/or inclination relative to the vehicle seat and the holding element.

Expediently, a front face of the receiving plate is configured so as to correspond to a rear face of the head restraint cushion, which is arranged by means of a positive, material and/or non-positive connection on the front face of the receiving plate, wherein at least one fastening means is arranged on a rear face of the receiving plate. In a simple manner, the head restraint is preferably arranged reversibly on at least one component of the height adjustment mechanism by means of the fastening means.

Advantageously, a portion of the holding element protruding over the backrest of the vehicle seat is enclosed entirely or virtually entirely by covering elements, wherein the covering elements, which are respectively configured in the shape of a half shell, are shaped on the peripheral edge so as to correspond to one another, such that the covering elements when arranged on one another form a hollow space in which the holding element is arranged. As a result, a visible portion of the preferably metal holding element is enclosed on all sides by the covering elements and the risk of injury to the seat occupant is reduced.

The height adjustment mechanism preferably comprises a carrier element which is arranged fixedly on the frame of the holding element and comprises receiving means for receiving the guide element by a positive, non-positive and/or material connection, further receiving means for positively and/or non-positively receiving the actuating cables, a holding portion and a centrally arranged recess. In this manner, all components of the height adjustment mechanism are arranged on the carrier element, forming a sub-assembly. Such a sub-assembly is able to be mounted on the holding element in a simple time-saving manner.

In an advantageous embodiment, the guide element is shaped in a substantially U-shaped manner with a round cross section and comprises a base and two arms arranged in parallel or virtually in parallel with one another, the respective ends thereof being bent back and aligned with one another. In this case, the arms advantageously permit a guidance of the receiving slide which is low in friction.

Particularly preferably, the receiving slide is displaceably arranged on the two arms of the guide element, for which in each case a guide is shaped or incorporated on or in the receiving slide on both sides, said guide being shaped so as to correspond with the arms of the guide element and sliding thereon.

Particularly expediently, an opening is formed on each guide, along the longitudinal extent of the guide, the width thereof being reduced in comparison with a width of the guide such that the arms of the guide element are introduced through the opening into the guide and positively held in the guide. In this manner, the receiving slide may be arranged in a latching manner on the arms of the guide element, in a time-efficient manner and without using tools, wherein advantageously the guide element is able to be already mounted in the carrier element.

In an expedient embodiment, the receiving slide on its front face has at least one fastening receiver which is configured so as to correspond with the fastening means on the rear face of the receiving plate. As a result, a reversible mechanical operative connection may be formed between the height adjustment mechanism and the head restraint.

In a further expedient embodiment, a first receiver for an upper actuating cable which acts on the upper face of the receiving slide and a second receiver for a lower actuating cable which acts on the lower face of the receiving slide are arranged on a rear face of the receiving slide, wherein the second receiver is formed at least partially in the manner of a guide, so that a spring element is able to be arranged in the second receiver such that a nipple arranged at the end of the actuating cable acts on a first end of the spring element, wherein a second end of the spring element is operatively connected to the receiving slide. As a result, the receiving slide is able to be actuated without clearance by means of the two actuating cables.

Figure 2:
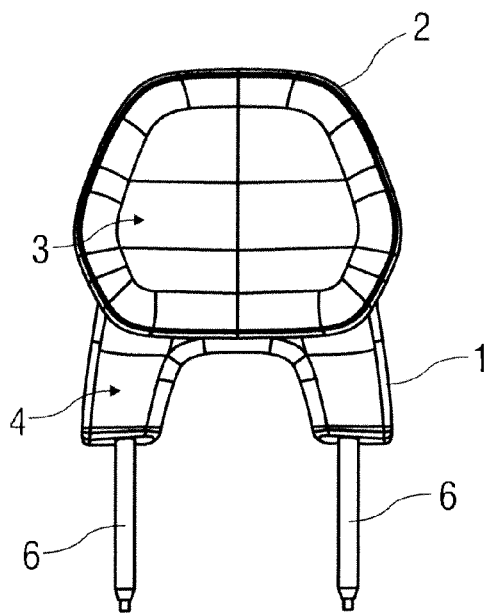
Figure 6:
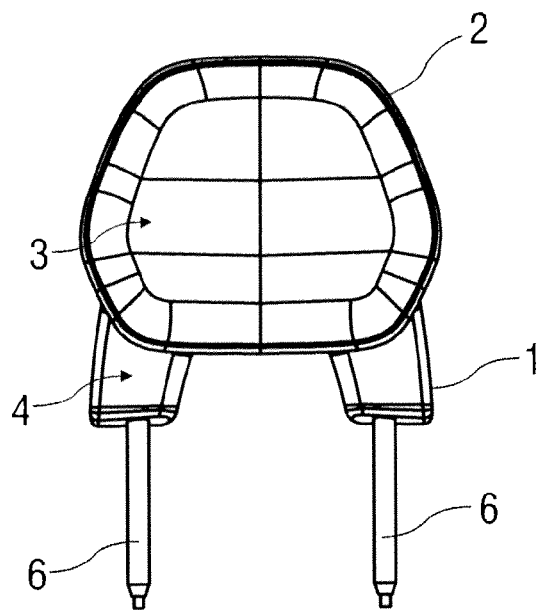
Figure 7:
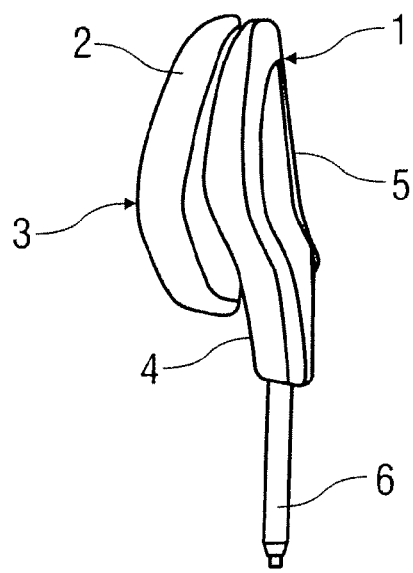
Figure 8:
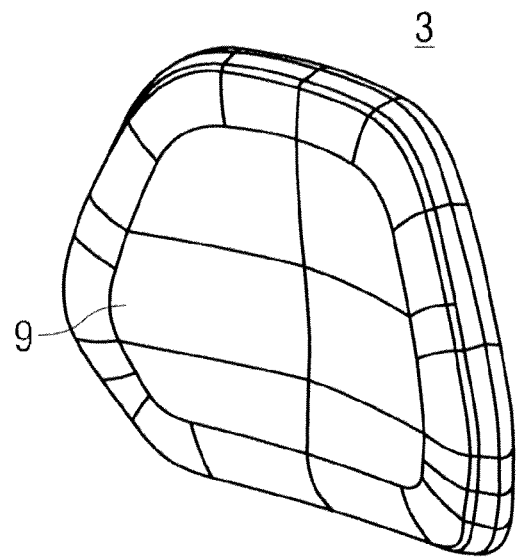
Figure 9:
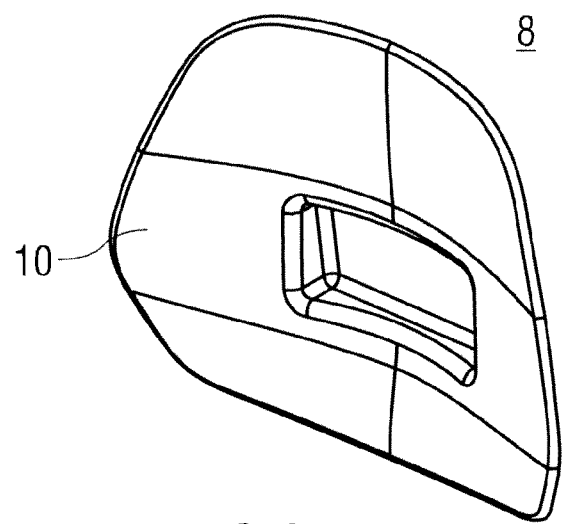
Figure 10:
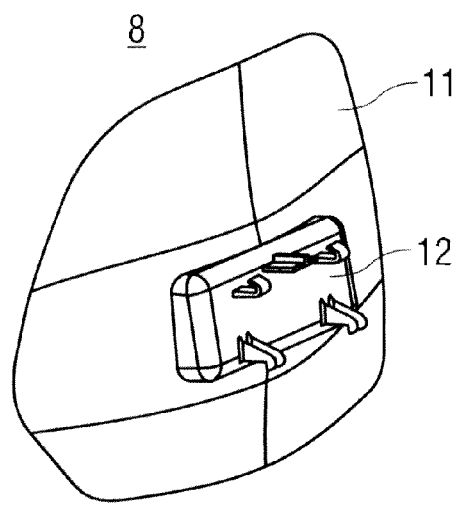
Figure 11:
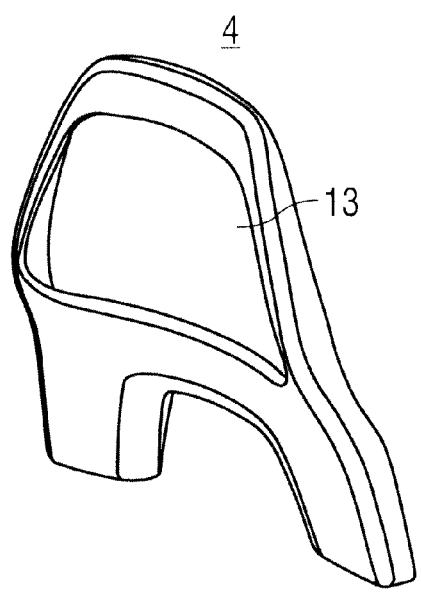
Figure 12:
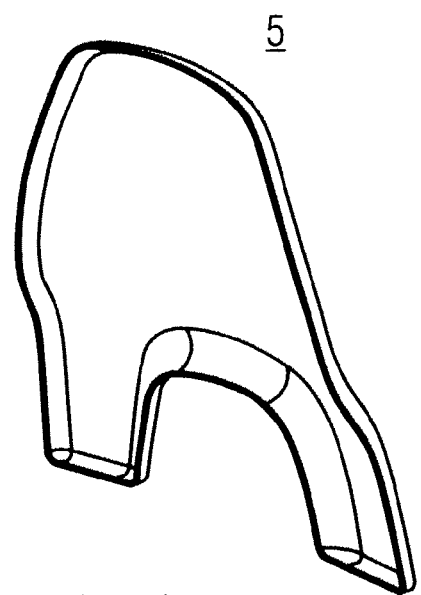
Figure 13:
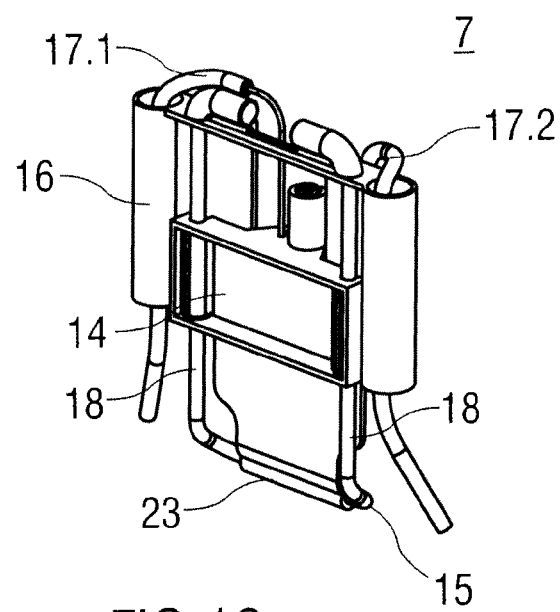
Figure 14:
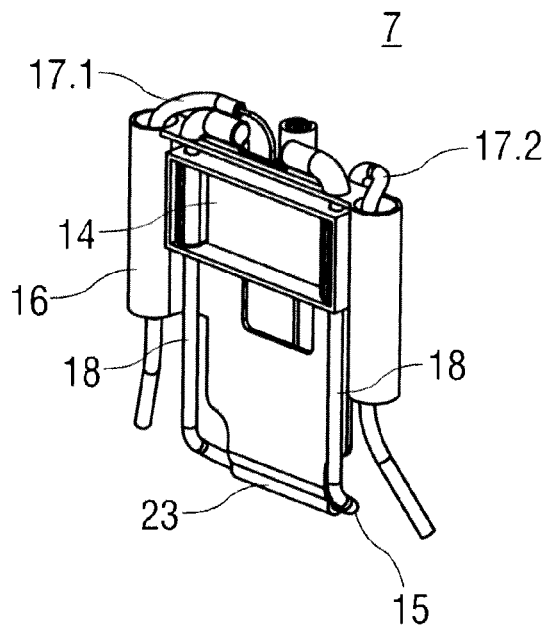
Figure 15:
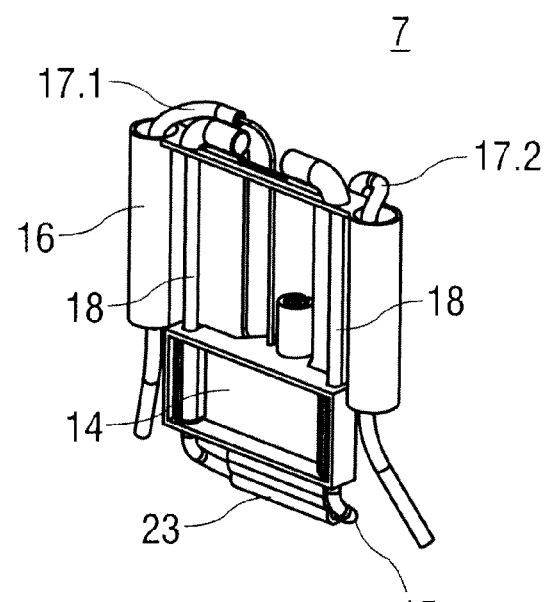
Figure 16:
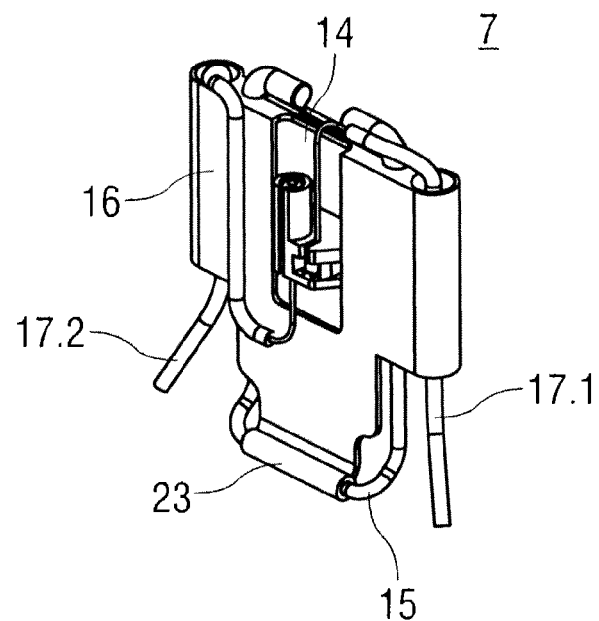
Figure 17:
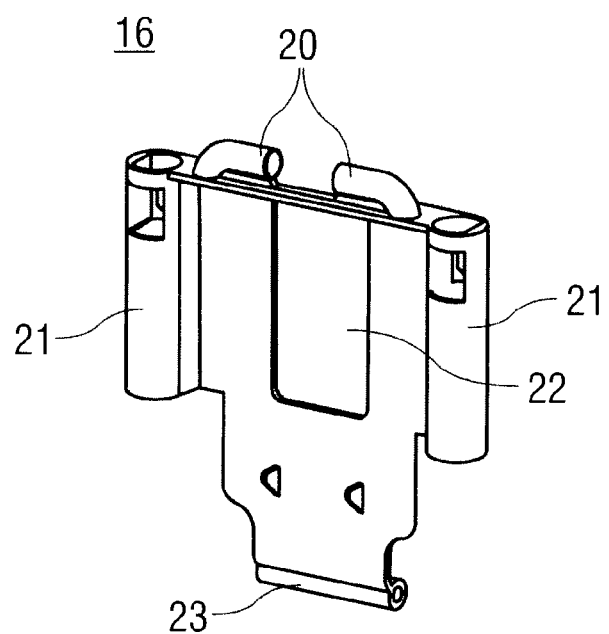
Figure 18:
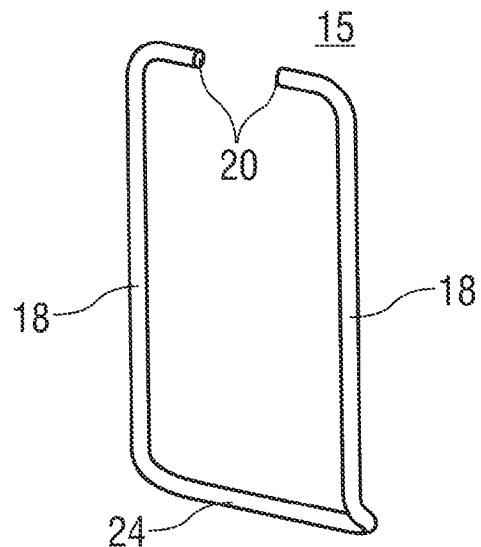
Figure 19:
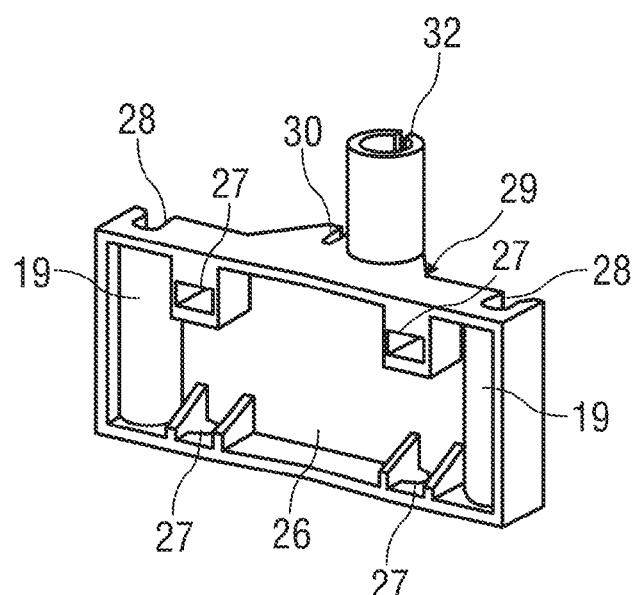
Figures 20, 21:
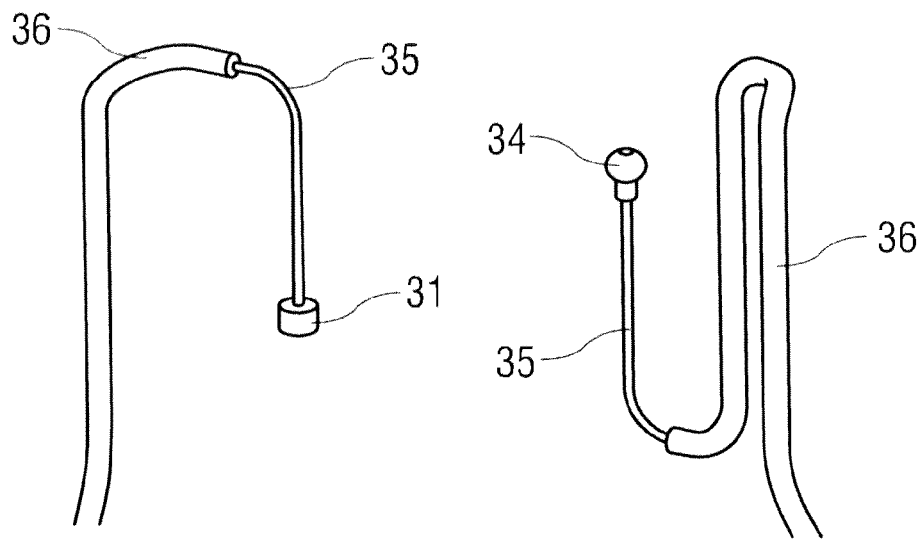
Figure 22:
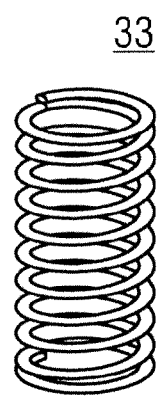

Exemplary embodiments of the invention are described in more detail hereinafter with reference to the drawings, in which:

FIG. 1 shows schematically a perspective view of a head restraint arranged on a holding element, FIG. 2 shows schematically a front view of a head restraint arranged on a holding element, FIG. 3 shows schematically a side view of a head restraint arranged on a holding element, FIG. 4 shows schematically a front view of a head restraint arranged on a holding element, wherein the head restraint is located in the highest position of adjustment, FIG. 5 shows schematically a side view of a head restraint arranged on a holding element, wherein the head restraint is located in the highest position of adjustment, FIG. 6 shows schematically a front view of a head restraint arranged on a holding element, wherein the head restraint is located in the lowest position of adjustment, FIG. 7 shows schematically a side view of a head restraint arranged on a holding element, wherein the head restraint is located in the lowest position of adjustment, FIG. 8 shows schematically a perspective view of a head restraint cushion, FIG. 9 shows schematically a perspective front view of a receiving plate of a head restraint cushion, FIG. 10 shows schematically a perspective rear view of a receiving plate of a head restraint cushion, FIG. 11 shows schematically a perspective rear view of a front covering element, FIG. 12 shows schematically a perspective view of a rear covering element, FIG. 13 shows schematically a perspective view of a height adjustment mechanism of a head restraint in the central position, FIG. 14 shows schematically a perspective view of a height adjustment mechanism of a head restraint in the highest position, FIG. 15 shows schematically a perspective view of a height adjustment mechanism of a head restraint in the lowest position, FIG. 16 shows schematically a perspective rear view of a height adjustment mechanism of a head restraint, FIG. 17 shows schematically a perspective view of a carrier element, FIG. 18 shows schematically a perspective view of a guide element, FIG. 19 shows schematically a perspective view of a receiving slide, FIG. 20 shows schematically a perspective view of an upper actuating cable, FIG. 21 shows schematically a perspective view of a lower actuating cable, and FIG. 22 shows schematically a perspective view of a spring element, Parts which correspond with one another are provided in all of the drawings with the same reference numerals.

In FIG. 1 a perspective view of a head restraint 2 arranged on a holding element 1 is shown schematically. Particularly preferably, the holding element 1 and the head restraint 2 are configured as a structural unit which is conventionally denoted as the head restraint 2.

In this case, the head restraint 2 comprises at least one head restraint cushion 3 which is arranged on the head restraint 2 facing in the direction of the seat occupant. The holding element 1 is at least partially clad with a front covering element 4 and a rear covering element 5. Two guide pins 6 are arranged on a lower end of the holding element 1, said guide pins being able to be arranged in corresponding recesses in a backrest of a vehicle seat, not shown. In this case, the holding element 1 is coupled fixedly to the frame of the backrest of the vehicle seat.

A height adjustment of the head restraint 2 relative to the vehicle seat takes place by means of a height adjustment mechanism 7 which is shown in more detail in FIGS. 13 to 16. In this case, the holding element 1 is fixedly arranged on and/or partially in the backrest of the vehicle seat, whilst the head restraint 2 is arranged on the holding element 1 so as to be adjustable in height and/or inclination relative to the vehicle seat and holding element 1.

In a first variant, the head restraint 2 may be arranged on the holding element 1 so as to be height-adjustable.

In a second variant, not shown, the head restraint 2 may be arranged on the holding element 1 so as to be adjustable in height and/or inclination.

In this case, the height adjustment preferably has a displacement path of 60 mm.

The inclination adjustment preferably has a pivoting angle, resulting in a displacement path of 40 mm at an upper end of the head restraint 2.

In FIG. 2 a front view of the head restraint 2 arranged on the holding element 1 is shown schematically.

In FIG. 3 a side view of the head restraint 2 arranged on the holding element 1 is shown schematically.

In FIG. 4 a front view of the head restraint 2 arranged on the holding element 1 is shown schematically, wherein the head restraint 2 is located in the highest position of adjustment of the height adjustment mechanism 7.

In FIG. 5 a side view of the head restraint 2 arranged on the holding element 1 is shown schematically, wherein the head restraint 2 is located in the highest position of adjustment of the height adjustment mechanism 7.

In FIG. 6 a front view of the head restraint 2 arranged on the holding element 1 is shown schematically, wherein the head restraint 2 is located in the lowest position of adjustment of the height adjustment mechanism 7.

In FIG. 7 a side view of the head restraint 2 arranged on the holding element 1 is shown schematically, wherein the head restraint 2 is located in the lowest position of adjustment of the height adjustment mechanism 7.

In FIG. 8 a perspective view of the head restraint cushion 3 is shown schematically. Said head restraint cushion 3 is preferably a conventional head restraint cushion which is formed from a foamed, dimensionally stable and resilient plastics material. In this case, at least one surface 9 of the head restraint cushion 3 oriented in the direction of a vehicle occupant is covered with a corresponding material, for example leather or fabric.

In FIG. 9 a perspective front view of a receiving plate 8 of the head restraint cushion 3 is shown schematically.

In FIG. 10 a perspective rear view of the receiving plate 8 of the head restraint cushion 3 is shown schematically.

A front face 10 of the receiving plate 8 is configured so as to correspond with a rear face of the head restraint cushion 3, which is able to be arranged by a positive, material and/or non-positive connection on the front face 10 of the receiving plate 8.

A plurality of fastening means 12, for example conventional latching lugs, are preferably centrally arranged on the rear face 11 of the receiving plate 8.

In FIG. 11 a perspective view of the front covering element 4 is shown schematically. Said front covering element 4 is preferably configured in the shape of a half shell, for example made of a plastics material or a plastics mixture. A recess 13 is formed in the front covering element 4 such that the fastening means 12 of the receiving plate 8 in the mounted state of the holding element 1 and the head restraint 2 are able to be passed through the recess 13, wherein the functioning of the height adjustment mechanism 7 is possible to its fullest extent.

In FIG. 12 a perspective view of the rear covering element 5 is shown schematically. The rear covering element 5 is preferably configured in the shape of a half shell, for example made of a plastics material or a plastics mixture. In this case, the rear covering element 5 is shaped peripherally around the edge so as to correspond with the front covering element 4, such that the covering elements 4, 5, which are configured in each case in the shape of a half shell, when arranged on one another, form a hollow space in which the holding element 1 is arranged. In this case, the holding element 1 is enclosed entirely or virtually entirely by the covering elements 4, 5. As a result, the preferably metal holding element 1 is enclosed on all sides by the covering elements 4, 5 and the risk of injury to the seat occupant is reduced.

In FIG. 13, a perspective view of the height adjustment mechanism 7 of the head restraint 2 is shown schematically in the central position.

In FIG. 14 a perspective view of the height adjustment mechanism 7 of the head restraint 2 is shown schematically in the highest position.

In FIG. 15 a perspective view of a height adjustment mechanism 7 of the head restraint 2 is shown schematically in the lowest position.

In FIG. 16 a perspective rear view of the height adjustment mechanism 7 of the head restraint 2 is shown schematically.

The height adjustment mechanism 7 comprises at least one receiving slide 14, at least one guide element 15, a carrier element 16 and two actuating cables 17.1 and 17.2.

The receiving slide 14 is arranged on the guide element 15 so as to be displaceable in terms of height. To this end, the guide element 15 is of substantially U-shaped configuration and made of a preferably metal material with a round cross section. The receiving slide 14 is positively arranged on the two arms 18 of the guide element 15 arranged parallel or virtually parallel with one another. To this end, in each case a guide 19 is formed or incorporated on or in the receiving slide 14 on both sides, said guide being shaped so as to correspond with the arms 18 of the guide element 15 and sliding thereon. The guide element 15 is arranged in the carrier element 16 by a positive, non-positive and/or material connection.

In FIG. 17 a perspective view of such a carrier element 16 is shown schematically. The carrier element 16 comprises receiving means 20 for receiving the guide element 15 by a non-positive, positive and/or material connection, further receiving means 21 for positively and/or non-positively receiving the actuating cables 17.1 and 17.2, a holding portion 23 and a centrally arranged recess 22.

The receiving means 21 are preferably integrally formed or shaped at the side of the carrier element 16 and configured as conventional guides for the actuating cables 17.1 and 17.2, which are able to be guided at least partially through the receiving means 21. The holding portion 23 is integrally formed or shaped on the lower face of the carrier element 16.

In a manner not shown, the carrier element 16 is mechanically coupled to the holding element 1.

In FIG. 18 a perspective view of the guide element 15 is shown schematically. The guide element 15 is shaped so as to be substantially U-shaped with a round cross section and comprises a base 24, two arms 18 arranged parallel or almost parallel with one another, the respective ends 25 thereof being bent back and aligned with one another.

In FIG. 19, a perspective view of the receiving slide is shown schematically. Said receiving slide comprises on its front face 26 fastening receivers 27 which are configured so as to correspond with the fastening means 12 on the rear face 11 of the receiving plate 8. As a result, a preferably reversible mechanical operative connection, for example a latching connection, is able to be formed between the fastening means 12 of the receiving plate 8 and the fastening receivers 27 of the receiving slide 14.

In each case, a guide 19 is shaped or incorporated on or in the receiving slide 14 on both sides, said guide being shaped so as to correspond with the arms 18 of the guide element 15. In this case, an opening 28 is formed on each guide 19 along the longitudinal extent of the guide 19, the width thereof being reduced in comparison with the width of the guide 19 such that the arms 18 of the guide element 15 may be introduced into the guide 19 through the opening 28 by the temporary, in particular resilient, widening thereof and held positively, for example latched, in the guide 19.

A first receiver 30 for an upper actuating cable 17.1 is formed on a rear face 29 of the receiving slide 14, said actuating cable on the upper face acting on the receiving slide 14. Said receiver 30 is preferably configured as a conventional receiver of a control cable and formed so as to correspond with a receiving nipple 31 of the actuating cable 17.1. Moreover, a second receiver 32 for a lower actuating cable 17.2 is arranged on the rear face 29 of the receiving slide 14, said actuating cable acting on the lower face of the receiving slide 14. In this case, the second receiver is shaped at least partially in the manner of a guide, so that a spring element 33, which is shown in more detail in FIG. 22, may be arranged in the second receiver 32 such that a nipple 34 arranged at the end of the actuating cable 17.2 acts on a first end of the spring element 33, wherein a second end of the spring element 33 acts on the receiving slide 14. As a result, the receiving slide 14 is able to be actuated without play by means of the two actuating cables 17.1 and 17.2.

In FIG. 20 a perspective view of the upper actuating cable 17.1 is shown schematically. In this case, the actuating cable is a conventional actuating cable or control cable which is a mobile mechanical element for transmitting a mechanical movement and/or tensile force by means of a flexibly arrangeable combination of a wire cable 35 and a sheath 36 which is stable in the direction of displacement and encloses the wire cable in the peripheral direction. The receiving nipple 31 is arranged at the end of the wire cable 35.

In FIG. 21, a perspective view of the lower actuating cable 17.2 is shown schematically, said actuating cable being formed as a conventional actuating cable or control cable. The nipple 34 is arranged at the end of the wire cable 35 of the lower actuating cable 17.2.

In FIG. 22, a perspective view of the spring element is shown schematically, said spring element preferably being formed as a conventional spiral compression spring.

During operation of the height adjustment mechanism 7, the guide element 15 is coupled at least partially to the carrier element 16. The base 24 of the guide element 15 is arranged on the holding element 23 of the carrier element 16 and the ends 25 of the guide element 15 are arranged in the respective receiving means 20 of the carrier element 16. The receiving slide 14 is arranged by means of its guides 19 on the arms 18 of the guide element 15, in the already described manner, so that the receiving slide 14 is able to slide up and down on the arms 18. In this case, the receivers 30 and 32 are arranged on the rear face 29 of the receiving slide 14 in the centrally arranged recess 22 of the carrier element 16 and protrude therefrom to the rear. By means of the actuating cables 17.1 and 17.2, in each case a tensile force is able to be applied to the receiving slide 14, wherein the upper actuating cable 17.1 acts on the upper face of the receiving slide and the lower actuating cable 17.2 acts on the lower face of the receiving slide 14. In this case, a tensile force of the upper actuating cable 17.1 effects an adjustment of the receiving slide 14 and the head restraint cushion 3 arranged thereon or the head restraint 2 in the direction of an upper position, whilst a tensile force of the lower actuating cable 17.2 effects an adjustment of the receiving slide 14 and the head restraint cushion 3 arranged thereon or the head restraint 2 in the direction of a lower position. In the manner described above, the actuating cable 17.1 and 17.2 is able to be actuated without play by means of the spring element 33.

In an embodiment, not shown, the height adjustment mechanism 7 is able to be actuated by an electric motor in place of the actuating cables 17.1 and 17.2.

LIST OF REFERENCE NUMERALS

1 Holding element
2 Head restraint
3 Head restraint cushion
4 Front covering element
5 Rear covering element
6 Guide pin
7 Height adjustment mechanism
8 Receiving plate
9 Surface
10 Front face
11 Rear face
12 Fastening means
13 Recess
14 Receiving slide
15 Guide element
16 Carrier element
17 Actuating cable
17.1 Upper actuating cable
17.2 Lower actuating cable
18 Arm
19 Guide
20 Receiving means
21 Further receiving means
22 Recess
23 Holding portion
24 Base
25 End
26 Front face
27 Fastening receiver
28 Opening
29 Rear face
30 Receiver
31 Receiving nipple
32 Second receiver
33 Spring element
34 Nipple
35 Wire cable
36 Sheath

The invention claimed is:

1. A height-adjustable head restraint for a vehicle seat, comprising:
a height adjustment mechanism including a receiving slide, which has a frame, and at least one guide element; and
at least one head restraint cushion fastened by a receiving plate fixedly to the frame of the receiving slide of the height adjustment mechanism such that the receiving plate is directly fixed to the frame of the receiving slide,
wherein the receiving slide is arranged in a height-adjustable manner on the at least one guide element of the height adjustment mechanism by at least two actuating cables acting in opposing directions on the receiving slide, said height adjustment mechanism being arranged in or on a holding element of the head restraint such that the height adjustment mechanism is positioned outside of a backrest of the vehicle seat,
wherein the holding element is configured to be fixedly arranged on the backrest,
wherein the at least one head restraint cushion is arranged on the holding element such that the height of the at least one head restraint cushion is adjustable relative to the holding element.

2. The height-adjustable head restraint as claimed in claim 1, wherein a front face of the receiving plate is configured so as to correspond with a rear face of the head restraint cushion, wherein the rear face of the head restraint cushion is configured to connect to the front face of the receiving plate, wherein at least one fastener is arranged on a rear face of the receiving plate.

3. The height-adjustable head restraint as claimed in claim 1, wherein a front face of the receiving slide has at least one fastening receiver which is configured so as to correspond with at least one fastener on a rear face of the receiving plate.

4. A vehicle seat with a height-adjustable head restraint as claimed in claim 1, wherein the at least one head restraint cushion is adjustable in height relative to the vehicle seat.

5. The height-adjustable head restraint as claimed in claim 1, wherein the at least one head restraint cushion is fastened directly to the receiving plate.

6. A height-adjustable head restraint for a vehicle seat, comprising:
a height adjustment mechanism including a receiving slide, which has a frame, and at least one guide element; and
at least one head restraint cushion fastened by a receiving plate fixedly to the frame of the receiving slide of the height adjustment mechanism,
wherein the receiving slide is arranged in a height-adjustable manner on the at least one guide element of the height adjustment mechanism by at least two actuating cables acting in opposing directions on the receiving slide, said height adjustment mechanism being arranged in or on a holding element of the head restraint such that the height adjustment mechanism is positioned outside of a backrest of the vehicle seat,
wherein the holding element is configured to be fixedly arranged on the backrest, wherein the at least one head restraint cushion is arranged on the holding element such that the height of the at least one head restraint cushion is adjustable relative to the holding element, wherein the guide element is shaped in a substantially U-shaped manner with a round cross section and comprises a base and two arms arranged in parallel or virtually in parallel with one another, wherein respective ends of each of the two arms are bent back and aligned with one another.

7. The height-adjustable head restraint as claimed in claim 6, wherein the receiving slide is displaceably arranged on the two arms of the guide element, wherein each side of the receiving slide includes a guide, wherein each of the guides corresponds with and is configured to slide along the arms of the guide element.

8. The height-adjustable head restraint as claimed in claim 7, wherein each of the guides includes an opening that extends along a longitudinal axis of the guide, wherein a width of the guide at the opening is less than a width of the guide at a region not at the opening, such that, when the arms of the guide element are introduced through the opening into the guide, the arms are positively held in the guide.

9. A height-adjustable head restraint for a vehicle seat, comprising:
  a height adjustment mechanism including a receiving slide, which has a frame, and at least one guide element; and
  at least one head restraint cushion fastened by a receiving plate fixedly to the frame of the receiving slide of the height adjustment mechanism,
  wherein the receiving slide is arranged in a height-adjustable manner on the at least one guide element of the height adjustment mechanism by at least two actuating cables acting in opposing directions on the receiving slide, said height adjustment mechanism being arranged in or on a holding element of the head restraint such that the height adjustment mechanism is positioned outside of a backrest of the vehicle seat,
  wherein the holding element is configured to be fixedly arranged on the backrest,
  wherein the at least one head restraint cushion is arranged on the holding element such that the height of the at least one head restraint cushion is adjustable relative to the holding element,
  wherein the at least two actuating cables includes an upper actuating cable and a lower actuating cable,
  wherein a first receiver for the upper actuating cable which acts on an upper face of the receiving slide and a second receiver for the lower actuating cable which acts on a lower face of the receiving slide are arranged on a rear face of the receiving slide, wherein the second receiver is formed at least partially as a guide, so that a spring element is able to be arranged in the second receiver such that a nipple, arranged at an end of the lower actuating cable, acts on a first end of the spring element, wherein a second end of the spring element is operatively connected to the receiving slide.

10. A vehicle seat comprising:
a height-adjustable head restraint, wherein the head restraint comprises:
  a height adjustment mechanism including a receiving slide, which has a frame, and at least one guide element; and
  at least one head restraint cushion fastened by a receiving plate fixedly to the frame of the receiving slide of the height adjustment mechanism,
  wherein the receiving slide is arranged in a height-adjustable manner on the at least one guide element of the height adjustment mechanism by at least two actuating cables acting in opposing directions on the receiving slide, said height adjustment mechanism being arranged in or on a holding element of the head restraint such that the height adjustment mechanism is positioned outside of a backrest of the vehicle seat,
  wherein the holding element is configured to be fixedly arranged on the backrest,
  wherein the at least one head restraint cushion is arranged on the holding element such that the height of the at least one head restraint cushion is adjustable relative to the holding element,
wherein the at least one head restraint cushion is adjustable in height relative to the vehicle seat,
wherein a portion of the holding element protruding over the backrest of the vehicle seat is enclosed entirely or virtually entirely by covering elements, wherein edges of each of the covering elements, which are configured in each case in the shape of a half shell, correspond with one another, such that the covering elements, when arranged on one another, form a hollow space in which the holding element is arranged.

* * * * *